United States Patent
Braunhut

[15] 3,673,986
[45] July 4, 1972

[54] METHOD AND MATERIALS USED FOR HATCHING BRINE SHRIMP

[72] Inventor: Harold N. Braunhut, c/o Honey Toy Industries, Inc. 200 Fifth Ave., New York, N.Y. 10010

[22] Filed: Nov. 12, 1970

[21] Appl. No.: 89,034

[52] U.S. Cl. ................................................................119/2
[51] Int. Cl. ..........................................................A01k 61/00
[58] Field of Search ....................................................119/1–4

[56] References Cited

UNITED STATES PATENTS

| | | | |
|---|---|---|---|
| 2,849,981 | 9/1958 | Rose et al. ................................. | 119/1 |
| 3,029,784 | 4/1962 | Elbreder et al. ........................... | 119/2 |

Primary Examiner—Aldrich F. Medbery
Attorney—Friedman & Goodman

[57] ABSTRACT

A method and materials used to provide an aquatic life habitat for hatching brine shrimp or similar crustaceans in tap water to give the appearance of instantaneous hatching. To a convenient amount of tap water a dry conditioning mixture comprising iodine-free sodium chloride, sodium sulfate, sodium carbonate, magnesium sulfate, magnesium chloride, potassium chloride is added. The conditioning mixture also contains a dehydrating agent such as calcium chloride, a chlorine removing agent such as sodium thiosulfate, and a quantity of dried eggs of Artemia salina type or the like. The aqueous medium is allowed to stand at room temperature for a period of 24 to 36 hours. To this treated, aged and purified aqueous habitat medium, a second mixture comprising magnesium sulfate, borax and sodium crystals, yeast, additional dried eggs, a dehydrating agent and a water-soluble dye is added.

10 Claims, No Drawings

METHOD AND MATERIALS USED FOR HATCHING BRINE SHRIMP

BACKGROUND OF THE INVENTION

This invention relates to a method and materials used to provide an aquatic life habitat for the hatching of brine shrimp or similar crustaceous. Brine shrimp require moisture for hatching and a saline medium approximating the composition of sea water for their proper development and growth. Brine shrimp upon hatching are almost microscopic in size and some species are practically colorless. Thus they cannot be seen and observed without difficulty, and therefore their growth and development cannot be enjoyed by the breeder or user.

SUMMARY OF THE INVENTION

This invention provides for making an aquatic life habitat for the hatching of brine shrimp in tap water and divides the materials that are necessary into two groups. The first a water purifier and conditioner group comprising a number of salts necessary for the creation of the proper saline environment including also a drying agent such as calcium chloride for maintaining the group in a dry condition, an oxidizing agent such as sodium thiosulphate and some brine shrimp eggs. This first group is added to the tap water and allowed to stand for 24 to 36 hours at room temperature. The second group is comprised of additional salts for the saline environment, food for the hatched brine shrimp, additional brine shrimp eggs, a drying agent such as dried Epsom salt and a water-soluble dye. The second group is added to the "aged" water medium whereby the dye colors in the water give the hatched brine shrimp of the first group easier visibility, thereby giving the impression of instant life.

Accordingly, an object of the present invention is to provide the brine shrimp with an aqueous habitat medium for their proper hatching, development and growth.

Another object of the invention is to provide means for the inhibition of the hatching of the shrimp until moisture is provided thereto.

A further object of the invention is to provide for a time delay whereby the hatched shrimp of the first group will be observed only after a lapse of a period of time, thereby permitting some of the shrimp to become of greater maturity prior to observation.

A still further object of the invention is to provide for the observation of the shrimp in a colored medium, thus increasing their visibility.

An added object of the invention is to provide for the coloring of the aqueous medium after some of the shrimp of the first group have hatched, thus giving the effect of an instantaneous creation of life when the second group containing the water soluble dye is added, and thereby greatly increasing the enjoyment of the breeder or user.

DESCRIPTION OF THE PREFERRED EMBODIMENT

Reference is now made to the method and materials used in the present invention for hatching the brine shrimp in tap water to give the appearance of instantaneous hatching. The present invention divides the materials required to react upon the tap water and the brine shrimp into two separate groups, a first group referred to as the purifier and conditioner group, and a second group referred to as the instant life group.

The purifier and conditioner group contains materials including salts, which when dissolved in the tap water create the necessary saline environment in which the brine shrimp will hatch and develop, such as iodine-free sodium chloride, sodium sulfate, sodium carbonate in the form of light soda ash, magnesium sulfate commonly known as Epsom salt, magnesium chloride and potassium chloride.

The purifier and conditioner group also contains a material such as sodium thiosulfate to remove any chlorine contained in the ordinary tap water, chlorine being harmful to brine shrimp. This group also contains dried eggs of small marine shrimp, the size of ground pepper, such as Artemia salina or similar brine shrimp, or the like.

In order to maintain this group in a dry moisture-free condition and thus inhibit premature hatching, a drying agent such as calcium chloride is included therein. This dry mixture may be kept preferably in a moisture-proof package for an indefinite period of time with little or no loss of its properties.

After experimentation with various ingredients and proportions, the following composition has been determined to be preferable over other combinations:

42.7% of iodine-free sodium chloride;
35.8% of Epsom salts;
13.3% of sodium sulfate;
3.3% of light soda ash;
1.7% of potassium chloride;
1.6% of calcium chloride;
0.16% of magnesium chloride;
0.03% of sodium thiosulfate; and
0.24% of Artemia salina eggs.

As above noted, the sodium chloride used should be non-iodized if the above proportions are used.

It is thus readily seen that the ingredients in the purifier and conditioner group will purify the tap water by removing the chlorine which may be in it, and put the tap water into the proper saline condition necessary for the hatching and development of the included brine shrimp eggs.

The purifier and conditioner group is placed in tap water which is then allowed to stand and age for from 24 to 36 hours at room temperature.

After the tap water has been purified, conditioned and aged as hereinbefore described, the second group is added to the treated water.

The instant life group contains additional salts for the maintenance of the required saline environment. Sodium tetraborate commonly known as borax and sodium carbonate in the form of diamond soda crystals may be added to the above-mentioned list of materials for producing a saline medium.

The instant life group also contains food material such as yeast for the hatched and developing brine shrimp. This second group also contains additional dried eggs of small marine shrimp.

As has been hereinbefore stated, the brine shrimp when newly hatched are small in size and practically colorless. Therefore, a water-soluble dye, preferably a vegetable dye is provided in the second group. The water-soluble dye will color the water and make the brine shrimp which may have been hatched from the eggs included in the purifier and conditioner group almost instantaneously visible. This will appear to the viewer as if the eggs just hatched, and the shrimp became alive and were enabled to swim almost instantaneously.

In order to maintain the second group in a dry moisture-free condition, a drying agent such as dried (anhydrous) Epsom salt is included. This second mixture is also preferably packaged in a moisture-proof container so that it may be kept dry for an indefinite period of time with little or no loss of its properties.

The following composition has been determined to be preferable over other combinations:

21.5% of dried (anhydrous) Epsom salts;
74.8% of Epsom salts;
1.3% of borax 40/200;
1.0% of light soda ash;
1.0% of diamond soda crystals;
0.33% of yeast;
0.33% of water-soluble dye; and
0.33% of Artemia salina eggs.

The preferable approximate amount of each mixture is one ounce avoirdupois of each group for each 12 fluid ounces of water.

Numerous changes in the composition and proportions hereindisclosed will suggest themselves to those skilled in the art. However, it is understood that the present disclosure relates to the preferred embodiment of the invention and is not to be construed as a limitation of the invention.

What is claimed is:

1. A composition for producing in a habitat for crustaceans, said habitat producing an appearance of instantaneous aquatic life when disposed in water, said habitat comprising a purifier and conditioner first group and an instant life second group, said first group including salts to create a saline environment, a material to remove chlorine from the water, dried eggs, and a drying agent to maintain said first group in a dry moisture free condition to inhibit premature hatching of said dried eggs, said second group including a water-soluble dye to color the water to make the life forms which have hatched from the eggs of said first group appear instantaneously to give the impression of instant life.

2. A habitat according to claim 1, wherein said first group substantially consists of:

42.7% of iodine-free sodium chloride;
35.8% of Epsom salts;
13.3% of sodium sulfate;
3.3% of light soda ash;
1.7% of potassium chloride;
1.6% of calcium chloride;
0.16% of magnesium chloride;
0.03% of sodium thiosulfate; and
0.24% of Artemia salina eggs.

3. A habitat according to claim 1, wherein said second group further includes additional salts for maintenance of said saline environment, food material for the hatched life forms, additional dried eggs, and a drying agent to inhibit premature hatching of said additional dried eggs.

4. A habitat according to claim 3 wherein said first group substantially consists of:

42.7% of iodine-free sodium chloride;
35.8% of Epsom salts;
13.3% of sodium sulfate;
3.3% of light soda ash;
1.7% of potassium chloride;
1.6% of calcium chloride;
0.16% of magnesium chloride;
0.03% of sodium thiosulfate; and
0.24% of Artemia salina eggs.

and said second group substantially consists of:

21.5% of dried (anhydrous) Epsom salts;
74.8% of Epsom salts;
1.3% of borax 40/200;
1.0% of light soda ash;
1.0% of diamond soda crystals;
0.33% of yeast;
0.33% of water-soluble dye; and
0.33% of Artemia salina eggs.

5. A habitat according to claim 4, wherein each of said groups is approximately one ounce avoirdupois for each twelve fluid ounces of water.

6. A method for producing in an aquatic life habitat an appearance of instantaneous life comprising disposing a first mixture including salts, a chlorine-removal material, dried aquatic life eggs and a drying agent to inhibit premature hatching of said dried eggs into water to purify and condition the water to create a saline environment which is free from chlorine to enable hatching and proper development and growth of the hatched life forms, allowing the resulting aqueous medium to age for a sufficient period of time to permit some of said eggs to hatch, and then disposing a second mixture including a water-soluble dye into said aqueous medium to make the hatched life forms appear instantaneously to give the impression of instantly appearing aquatic life.

7. A method according to claim 6, wherein said first mixture substantially consists of:

42.7% of iodine-free sodium chloride;
35.8% of Epsom salts;
13.3% of sodium sulfate;
3.3% of light soda ash;
1.7% of potassium chloride;
1.6% of calcium chloride;
0.16% of magnesium chloride;
0.03% of sodium thiosulfate; and
0.24% of Artemia salina eggs.

8. A method according to claim 6, wherein said second mixture further includes additional salts for maintaining said saline environment, food material for the hatched life forms, additional dried eggs, and a drying agent to inhibit premature hatching of said additional dried eggs.

9. A method according to claim 8, wherein said first mixture substantially consists of:

42.7% of iodine-free sodium chloride;
35.8% of Epsom salts;
13.3% of sodium sulfate;
3.3% of light soda ash;
1.7% of potassium chloride;
1.6% of calcium chloride;
0.16% of magnesium chloride;
0.03% of sodium thiosulfate; and
0.24% of Artemia salina eggs, and said second mixture substantially consists of:

21.5% of dried (anhydrous) Epsom salts;
74.8% of Epsom salts;
1.3% of borax 40/200;
1.0% of light soda ash;
1.0% of diamond soda crystals;
0.33% of yeast;
0.33% of water-soluble dye; and
0.33% of Artemia salina eggs.

10. A method according to claim 9, wherein each of said mixtures is approximately one ounce avoirdupois for each twelve fluid ounces of water.

* * * * *